United States Patent
Hummel et al.

(10) Patent No.: US 10,176,253 B2
(45) Date of Patent: Jan. 8, 2019

(54) FUSION OF CLUSTER LABELING ALGORITHMS BY ANALYZING SUB-CLUSTERS

(71) Applicant: International Business Machines Corporation, Armonk, NY (US)

(72) Inventors: Shay Hummel, Binyamina (IL); Haggai Roitman, Yokneam Elit (IL); Michal Shmueli-Scheuer, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 14/607,092

(22) Filed: Jan. 28, 2015

(65) Prior Publication Data
US 2016/0217201 A1    Jul. 28, 2016

(51) Int. Cl.
*G06F 17/30*    (2006.01)

(52) U.S. Cl.
CPC .............................. *G06F 17/30705* (2013.01)

(58) Field of Classification Search
CPC ........... G06F 17/30011; G06F 17/3053; G06F 17/30598; G06F 17/30705; G06F 17/30601; G06F 17/3064; G06F 17/30713
See application file for complete search history.

(56) References Cited

U.S. PATENT DOCUMENTS

| | | | |
|---|---|---|---|
| 7,185,001 B1 | 2/2007 | Burdick et al. | |
| 7,971,150 B2 | 6/2011 | Raskutti et al. | |
| 8,145,618 B1 | 3/2012 | PFleger et al. | |
| 8,583,648 B1 | 11/2013 | Majkowska | |
| 8,676,815 B2 | 3/2014 | Deng et al. | |
| 2012/0269436 A1* | 10/2012 | Mensink | G06K 9/00624 382/180 |

FOREIGN PATENT DOCUMENTS

JP    4737435    8/2011

OTHER PUBLICATIONS

Bozkurt et al. "Data Fusion and Bias Performance evaluation of various data fusion methods", Dec. 12, 2007.*
Pucktada et al. "Automatically Labeling Hierarchical Clusters" Copyright 2004 ACM.*

(Continued)

*Primary Examiner* — Jeff A Burke
*Assistant Examiner* — Cindy Nguyen

(57) ABSTRACT

According to some embodiments of the present invention there is provided a computerized method for labeling a cluster of text documents. The method comprises receiving a document cluster and producing automatically multiple document sub-clusters determined by randomly changing some documents. The method applies multiple cluster labeling algorithms on the cluster and on each sub-cluster, to generate ordered lists. The method comprises generating a ranked label list for each cluster labeling algorithm by computing automatically label values, one for each cluster label in the lists of the selected algorithm, and re-ranking the ordered list. The method combines the re-ranked label lists using a label fusing algorithm to produce a fused label list.

14 Claims, 6 Drawing Sheets

(56) References Cited

OTHER PUBLICATIONS

Sen Xu et al., "A Novel Cluster Combination Algorithm for Document Clustering", Intelligent Science and Intelligent Data Engineering Lecture Notes in Computer Science vol. 7751, 2013, pp. 189-195.
P. Venkateshkumar., "Using Data Fusion for a Context Aware Document Clustering", International Journal of Computer Applications (0975-8887) vol. 72—No. 6, pp. 17-20 May 2013.
Lei Meng et al., "Semi-Supervised Heterogeneous Fusion for Multimedia Data Co-Clustering", Knowledge and Data Engineering, IEEE Transactions on vol. 26, Issue: 9, pp. 2293-2306, Mar. 2013.
Gordon V. Cormack et al., "Reciprocal Rank Fusion outperforms Condorcet and individual Rank Learning Methods", SIGIR '09 Proceedings of the 32nd international ACM SIGIR conference on Research and development in information retrieval, pp. 758-759, 2009.

\* cited by examiner

FUSION OF CLUSTER LABELING ALGORITHMS BY ANALYZING SUB-CLUSTERS

BACKGROUND

The present invention, in some embodiments thereof, relates to document cluster labeling and, more specifically, but not exclusively, to fusion of multiple labeling algorithms on a cluster of documents.

Standard document clustering algorithms do not provide labels to characterize the clusters chosen. Cluster labeling is provided by cluster labeling algorithms that examine the contents of the documents in the cluster to find a label that best describes the topic(s) of the document cluster and helps distinguish the clusters from each other. For a given cluster of documents, as coherent as possible, a cluster labeling algorithm returns at least a single label that may best describe the cluster's main topic. Labeling clusters of documents is a fundamental and important task in information retrieval, including for applications of multi-document summarization, user profiling, and the like. For example, document cluster labeling algorithms are used for business intelligence and financial performance management. For example, document cluster labeling algorithms are used for enterprise content management. For example, document cluster labeling algorithms are used for business analytics and optimization. For example, document cluster labeling algorithms are used for user profiling in customer and social analysis.

Direct labeling algorithms for cluster labeling extract the label(s) from the cluster documents. For example, direct labeling algorithms include feature selection, most frequent document terms (keywords, phrases, n-grams, and the like), terms most frequent in cluster centroid, anchor text, named entities, cluster hierarchy, and the like. Indirect labeling algorithms extract the label from external relevant label sources. For example, indirect labeling algorithms include using labels extracted from Wikipedia categories, Freebase structured data, Dbpedia structured data, and the like.

SUMMARY

According to some embodiments of the present invention there is provided a computerized method for labeling a cluster of text documents. The method comprises receiving a document cluster comprising two or more text documents. The method comprises producing automatically two or more document sub-clusters, wherein each of the two or more document sub-clusters is determined by randomly changing one or more documents of the two or more text documents from the document cluster. The method comprises applying automatically two or more cluster labeling algorithms on the document cluster and each of the two or more document sub-clusters, to generate two or more ordered lists. The method comprises generating two or more ranked label lists one each for each of the two or more cluster labeling algorithms. The generation of ranked label lists comprises selecting automatically a selected algorithm from one of the two or more cluster labeling algorithms. The generation of ranked label lists comprises computing automatically two or more label values, one for each of the two or more cluster labels in the two or more ordered lists for the selected algorithm. The generation of ranked label lists comprises generating one of the two or more ranked label lists corresponding to the selected algorithm, wherein the one ranked label list is computed from respective the two or more ordered lists and respective the label value for each of respective the two or more cluster labels. The method comprises combining the two or more ranked label lists using a label fusing algorithm to produce a fused label list.

Optionally, the label fusing algorithm is computing using the label value for each of the two or more cluster labels in addition to the two or more ranked label lists.

Optionally, the label fusing algorithm is selected from a group consisting of a CombMNZ fusing algorithm, a CombSUM fusing algorithm, a CombSUM fusing algorithm, a reciprocal rank fusion algorithm, and a Borda-Count fusion algorithm.

Optionally, the label fusing algorithm incorporates the two or more label values in fusing labels from the two or more cluster labeling algorithms.

Optionally, the random changes and the two or more document sub-clusters are determined by a training document cluster, wherein the training document cluster has a true label list determined by manual inspection, and wherein the random changes are determined by a comparing of the fused label list with the true label list.

Optionally, the random changes comprise a removal of at least one of the two or more text document from the document cluster.

Optionally, the random changes are performed on a percentage of the two or more text documents.

Optionally, each of the two or more document sub-clusters comprises an equal number of text documents.

Optionally, each of the two or more document sub-clusters comprises a number of text documents determined randomly according to a Gaussian distribution.

Optionally, for each of the two or more cluster labeling algorithms a different set of the two or more document sub-clusters is produced, and wherein each of the different set comprises different the random changes.

Optionally, a single set of the two or more document sub-clusters is produced, and wherein the single set is used for each of the two or more cluster labeling algorithms.

Optionally, the method is offered as a service.

Optionally, the true label list determined by manual inspection is determined incrementally until the comparing produces a statistical confidence above a confidence threshold and a statistical power above a power threshold.

According to some embodiments of the present invention there is provided a computer readable medium comprising computer executable instructions adapted to perform the method described herein.

According to some embodiments of the present invention there is provided a computer program product for labeling a cluster of text documents. The computer program product comprises a computer readable storage medium. Stored on the computer readable storage medium are first program instructions executable by a processor to cause the device to receive a document cluster comprising two or more text documents. Stored on the computer readable storage medium are second program instructions executable by the device to cause the device to produce automatically two or more document sub-clusters, wherein each of the two or more document sub-clusters is determined by randomly changing one or more documents of the two or more text documents from the document cluster. Stored on the computer readable storage medium are third program instructions executable by the device to cause the device to apply automatically two or more cluster labeling algorithms on the document cluster and each of the two or more document sub-clusters, to generate two or more ordered lists. Stored on the computer readable storage medium are fourth program instructions executable by the device to cause the device to generate two or more ranked label lists one for each of the two or more cluster labeling algorithms. Generating a ranked label list comprises selecting automatically a selected algorithm from one of the two or more cluster labeling algorithms. Generating a ranked label list comprises computing automatically two or more label values, one for each of the two or more cluster labels in the two or more ordered lists for the selected algorithm. Generating a ranked label list comprises generating one of the two or more ranked label lists corresponding to the selected algorithm, wherein the one ranked label list is computed from respective the two or more ordered lists and respective the label value for each of respective the two or more cluster labels. Stored on the computer readable storage medium are fifth program instructions executable by the device to cause the device to combine the two or more ranked label lists using a label fusing algorithm to produce a fused label list.

According to some embodiments of the present invention there is provided a computerized system for labeling a cluster of text documents. The computerized system comprises a user interface, for controlling and monitoring the computerized system. The computerized system comprises a data interface, for receiving a document cluster. The computerized system comprises one or more processing units. The processing unit comprises a cluster randomizing module configured to receive a document cluster and produce automatically two or more randomized sub-clusters, where each of the two or more randomized sub-clusters is created from the document cluster after one or more changes to one or more text documents of the document cluster. The processing unit comprises a label ranking module configured to receive the two or more randomized sub-clusters, apply two or more cluster labeling algorithms to each of the two or more randomized sub-clusters to produce two or more label lists, determine a label value for each label of the two or more cluster labeling algorithms, and re-rank each of the two or more label lists for each of the two or more cluster labeling algorithms according to the label value. The processing unit comprises a label fusion module configured to receive re-ranked the two or more label lists, fuse the two or more label lists together to a single list for the document cluster, and send the single list.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
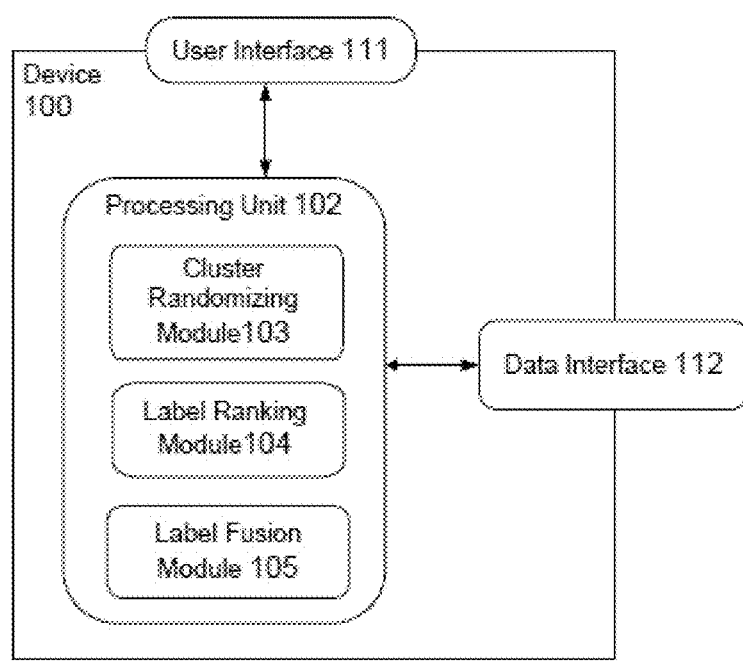
FIG. 1 is a system for running a label fusion process wherein a document cluster is processed using multiple labeling algorithms, according to some embodiments of the invention.

In many cases, existing cluster labeling algorithms such as the Jensen-Shannon Divergence (JSD) and Score Prorogation (SP) labeling algorithms as described by Carmel et al in "Enhancing Cluster Labeling using Wikipedia" published in Proceedings of the 32nd international ACM SIGIR conference on Research and development in information retrieval (pages 139-146) are inconclusive. No dominant cluster labeling algorithm can be found for any given dataset and quality measure, such as quality measures Mean Reciprocal Rank (MRR@K), match-at-k (Match@K), and the like. For example, match-at-k is defined as the relative number of clusters for which at least one of the top-k labels is correct. Therefore, a combination of several cluster labeling algorithms is expected to produce a better cluster labeling choice. However, no such combination method exists that is fully tailored for the cluster labeling task.

According to some embodiments of the present invention there is provided a method and a system, for fusing multiple cluster labeling algorithms using sub-cluster analysis.

Given a document cluster, the method produces two or more sub-clusters by randomly changing one or more documents of the original cluster, computes a two or more label lists using two or more cluster labeling algorithms applied to each sub-cluster, re-ranks the label list produced by each algorithm according to a mathematical agreement computed by a decisiveness value of the rank of the labels in the label lists, and fuses the re-ranked lists from different labeling algorithms by weighing the labels with the a respective decisiveness value. A decisiveness value is determined for each label by applying the labeling algorithm to two or more document sub-clusters derived from the given document cluster, and computing a mathematical agreement of the resulting label lists. As used herein, the term decisiveness value is defined for a cluster label as the average pair-wise mathematical agreement between the rankings of the label in multiple label lists produced by labeling algorithms applied to all pairs of sub-clusters, and will be defined computationally by an equation herein. The sub-clusters are derived from the given document cluster by modifying at least one document from the document cluster. As used herein, the term sub-cluster is defined as any group of documents derived from the document cluster that has at least one document changed in deriving that sub-cluster. For example, a sub-cluster is derived when one or more documents are removed and/or added from the document cluster. For example, a sub-cluster is derived when the text of one or more documents is modified. Each label of the labeling algorithm results receives a decisiveness value by comparing the relative rank of the label in the labeling results computed by the labeling algorithm on multiple, changed sub-clusters. By re-ranking each labeling algorithm's labeling results according to their decisiveness values, the results may be a better representation of the labels for that document cluster given that labeling algorithm. Multiple labeling algorithm labeling results are then fused together to produce a single list of labels for the given document cluster.

Optionally, multiple labeling algorithm's re-ranked label list results are fused using a CombMNZ fusion algorithm.

Optionally, multiple labeling algorithm's re-ranked label list results are fused using a CombSUM fusion algorithm.

Optionally, multiple labeling algorithm's re-ranked label list results are fused using the decisiveness values for each label of each list.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a system 100 for label fusion of a document cluster using multiple labeling algorithms, according to some embodiments of the invention. The system comprises a user interface 111 for control of a label fusing method. The system further comprises a data interface 112 for receiving a document cluster. For example, the data interface 112 is a network interface, a universal serial bus interface, a bus interface, a Serial Advanced Technology Attachment, or the like. The system comprises a processing unit 102 for receiving the document cluster and producing a list of fused labels from multiple cluster labeling algorithms. The processing unit 102 is configured with software modules to implement embodiments of the invention. For example, the modules are stored in computer memory, on attached non-volatile storage, and the like. The processing unit 102 includes a Cluster Randomizing Module 103 to receive a document cluster and produce a group of randomized sub-clusters, where each sub-cluster is created from the received cluster after one or more changes to the documents of the cluster. The processing unit 102 includes a Label Ranking Module 104 receives the group of sub-clusters, applies two or more cluster labeling algorithms to each sub-cluster, determines a decisiveness value for each label of each labeling algorithm, and re-ranks the labels of each labeling algorithm according to the decisiveness value for that labeling algorithm's labels. The processing unit 102 includes a Label Fusion Module 105 receives the re-ranked label list for each labeling algorithm, fuses the lists together to produce a single list of fused labels for the document cluster, and sends the fused label list to the user interface 111 and/or data interface 112.

Figure 2:
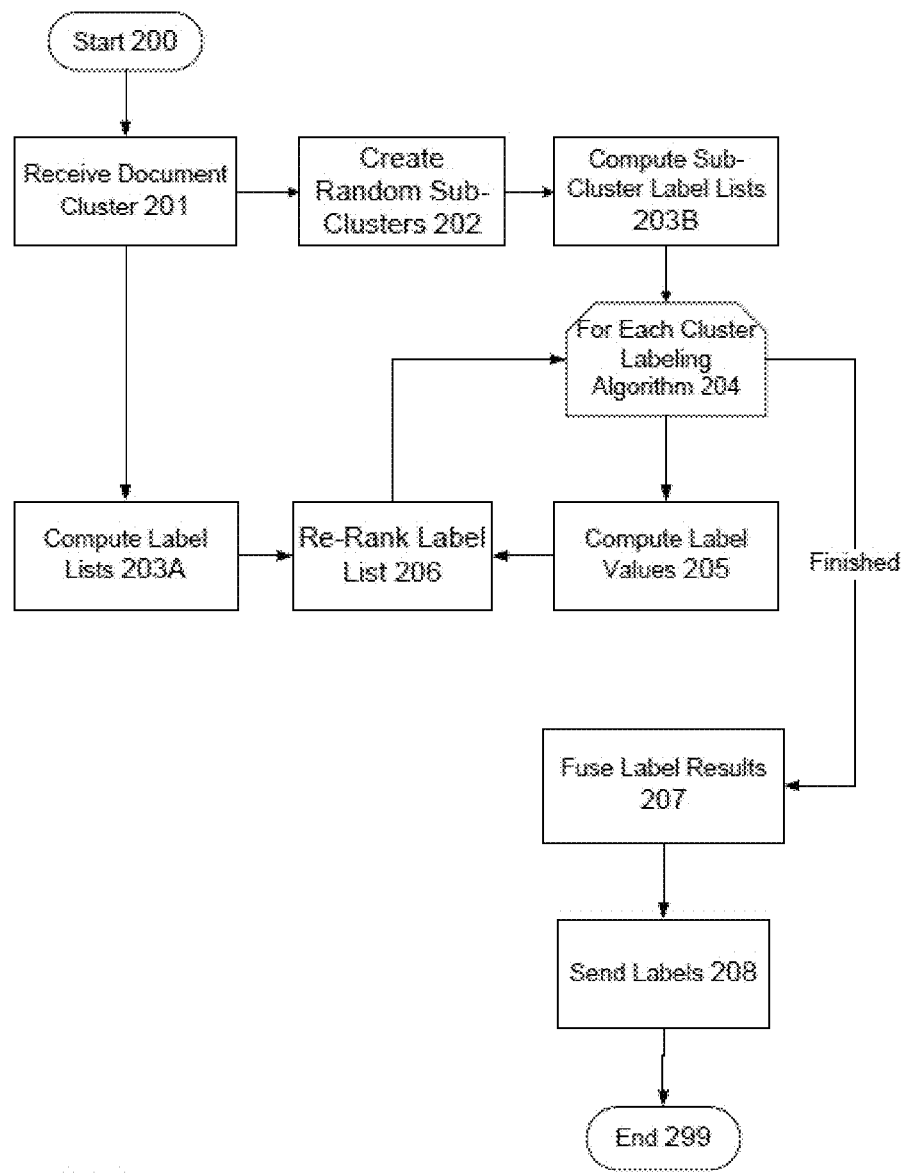
FIG. 2 is a flowchart running a label fusion process wherein a document cluster is processed using multiple labeling algorithms, according to some embodiments of the invention.

Reference is now made to FIG. 2, which is a flowchart for label fusion of a document cluster using multiple labeling algorithms, according to some embodiments of the invention. The method actions start 200 with receiving 201 a document cluster to a computerized processing unit 102 through a data interface 112. Multiple cluster labeling algorithms are used to compute label lists 203A for the document cluster, one each for each algorithm. An action of creating 202 a group of random sub-clusters is performed by a Cluster Randomizing Module 103. Multiple labeling algorithms are used to compute label lists 203B for each sub-cluster, where for each labeling algorithm 204, decisiveness values of cluster labels are computed 205 and the document cluster label list produced at step 203A from each labeling algorithm is re-ranked 206 according to their decisiveness values by a Label Ranking Module 104. When all cluster labeling algorithm results have been re-ranked, the labeling results are fused 207 together by the Label Fusion Module 105, and the fused label list is sent to the data interface 112 for downstream utilization.

Embodiments of the current invention are based on the premise that results of a cluster labeling algorithm for a given input document cluster should remain stable when documents of the cluster are slightly changed. Labels determined by a labeling algorithm are re-ranked according to the decisiveness value with respect to each of its suggested labels.

Figure 3:
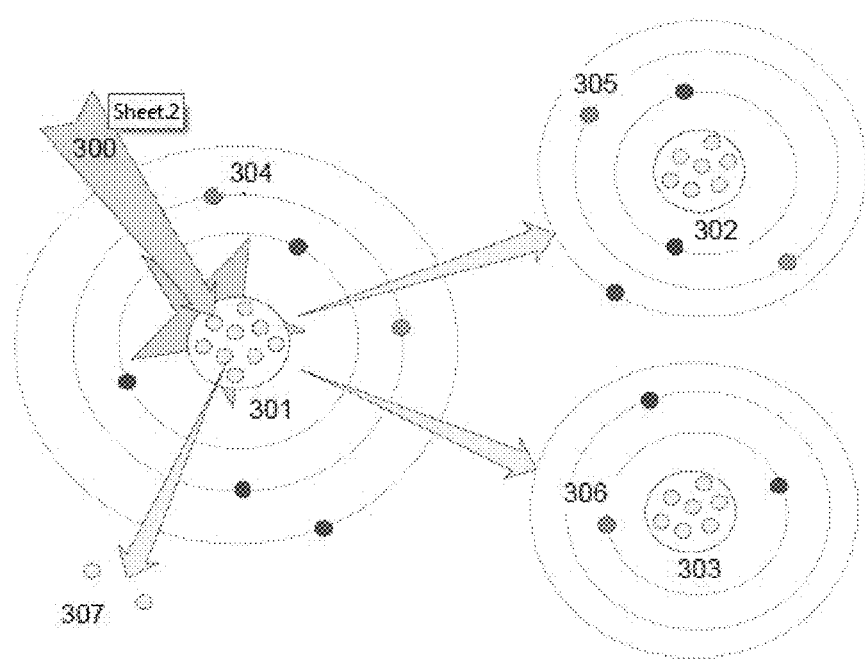
FIG. 3 is a schematic illustration depicting labeling of sub-clusters with atomic fission, according to some embodiments of the invention.

Reference is now made to FIG. 3, which is a schematic illustration comparing labeling of sub-clusters with atomic fission, according to some embodiments of the invention. Embodiments 300 of the current invention applied to a document cluster 301 received by a processing unit 102 via a data interface 112, produce sub-clusters, as at 302 and 303, where each sub-cluster is based on the document cluster with one or more changes to one or more documents of the cluster, such as removing 307 one or more of the documents from cluster. The changes to the document cluster are performed in the processing unit by a Cluster Randomizing Module 103. When a labeling algorithm is used by a Label Ranking Module 104 to compute a label list for a document cluster, a list of labels 304 is produced, illustrated as the electron orbit circles surrounding the cluster 301. In the comparison with atomic fission, the atom nucleus is the document cluster 301 with documents as its nuclear subatomic particles (protons and neutrons). Labels 304 suggested by a labeling algorithm for that cluster are illustrated as electrons positioned at orbits that reflect the position of each label in the label list produced by the labeling algorithm. The cluster labeling algorithm's "decisiveness" (stability) with respect to its label suggestions (electron orbital configurations) may be estimated by a process of "cluster fission". By introducing some "energy" 300 in the form of cluster noise which excludes (a small) fraction of the cluster's documents 307, the cluster may be "split" into sub-clusters ("fission nuclei" 302 and 303). When the labeling algorithm is used by a Label Ranking Module 104 to compute a list of labels for the sub-clusters, as at 302 and 303, sub-cluster label lists as at 302 and 306 respectively are generated, shown as the respective electron orbit circles. By comparing the label lists as at 304, 305 and 306, a value for the consistency, or "decisiveness", of the labeling algorithm can be determined by a Label Ranking Module 104 for each label, and the labels re-ranked according to the performance of the labeling algorithm on the cluster and sub-clusters.

Figure 4:
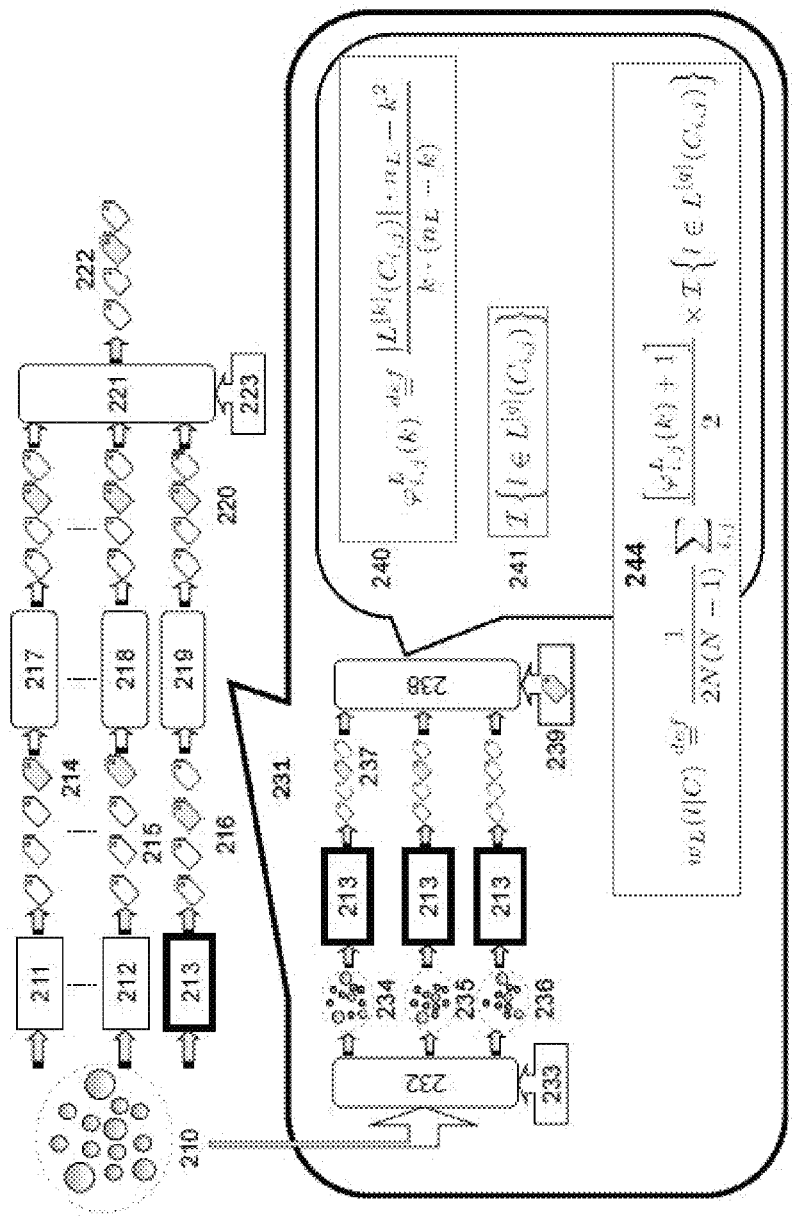
FIG. 4 is a graphic illustration of cluster label fusion using label decisiveness values, according to some embodiments of the invention.

Reference is now made to FIG. 4, which is a graphic illustration of cluster label fusion using label decisiveness values, according to some embodiments of the invention. An input document cluster 210 received by the processing unit 102 via a data interface 112 can be labeled by a Label Ranking Module 104 using multiple cluster labeling algorithms 211, 212, and 213 to a list of cluster labels 214, 215, and 216, one for each algorithm. Each list of top-k cluster labels 214, 215, and 216 is also re-ranked by the Label Ranking Module 104, according to a decisiveness value for each label as at 217, 218, and 219, respectively, producing a re-ranked list of labels for each algorithm as at 220. The top-k labels are the first k labels in each label list. The re-ranked label lists are fused 221 by a Label Fusion Module 105 given a fusion algorithm 223, such as CombMNZ, CombSUM, CombMAX and the like, producing a fused label list 222. For example, the details of computing decisiveness values for re-ranking of a labeling algorithm's results 216 is illustrated as at 231 for labeling algorithm 213. The Cluster Randomizing Module 103 receives an input document cluster 210 and modifies 232 the cluster to N number of "noisy" sub-clusters 234, 235, and 236, each containing a "noise level" given as a percentage of documents changed 233. The Label Ranking Module 104 applies a labeling algorithm 213 to each of the sub-clusters 234, 235, and 236 producing sub-cluster label lists as at 237. For each label 239 in the lists, a decisiveness values is computed 238 by the Label Ranking Module 104 using an equation for the general pair-wise cluster label list agreement 240 and an equation for the pair-wise cluster label list agreement on position of label 239 as ranked in each list 241. The decisiveness value equation 244 is computed by the Label Ranking Module 104 to each label 239 on the label algorithm result lists 237 and the labels from all lists are combined and ranked according to the decisiveness value.

The application will now give a mathematical example of computing decisiveness values for cluster labels, according to some embodiments of the invention. Let C denote a cluster of documents, received by a processing unit 102. For a given cluster C, a cluster labeling algorithm L suggests one or more labels that best represent the cluster's main topic. In general, two main types of cluster labeling algorithms may be employed, namely direct and indirect labeling algorithms. Cluster labels may be directly extracted from the content of the cluster's documents. For example, cluster labels can be extracted using feature selection labeling algorithms, choosing the most frequent terms (keywords, n-grams, phrases, and the like) in the cluster or the top weighted cluster centroid's terms, using document anchor text, named entities, utilizing the cluster's hierarchy, and the like. Cluster labels may be extracted indirectly using external relevant label sources, such as using Wikipedia's categories, Dbpedia's graph, Freebase's concepts, and the like.

A set of cluster labeling algorithms $\mathcal{L} = \{L_1, \ldots, L_m\}$ is used to compute lists of cluster labels by the processing unit 102 from a document cluster C received via the data interface 112. Each labeling algorithm $L \in \mathcal{L}$ takes a document cluster and/or sub-cluster C as an input and produces a list of $n_L$ distinct candidate cluster labels $L(C) = l_1, l_2, \ldots, l_n$). Each candidate label $l \in L(C)$ is scored by labeling algorithm L according to how well label 1 represents the main topic of cluster C.

Let $S_L(l|C)$ denote the score assigned to label $l \in L(C)$ by labeling algorithm $L \in \mathcal{L}$ and let $L^{[k]}(C)$ denote the list of top-k scored labels. In addition, let rank($l|L(C)$) denote the rank of label $l \in L(C)$ according to its relative score $S_L(l|C)$.

For a given cluster labeling algorithm $L \in \mathcal{L}$ and a label $l \in L^{[k]}(C)$ suggested by L and ranked at position $1 \le \text{rank}(l|L(C)) \le k$, the decisiveness value of labeling algorithm L with respect to that specific label at that specific ranked position is computed by the Label Ranking Module 104.

The decisiveness value is derived by measuring the effect of changes to the input cluster C on the labeling algorithm L's labeling decisions. For example, changed versions of a given cluster C are produced by the Cluster Randomizing Module 103 by sampling several sub-clusters, each containing a subset of the documents of the original cluster C. In this example, for a given noise level, $\theta \in [0,1]$, a sub-cluster $C_i \subset C$ is sampled by the Cluster Randomizing Module 103 by randomly choosing $(1-\theta) \times |C|$ of the input cluster's (C) documents, where $|C|$ denotes the number of documents in cluster C. The random noise $\theta$ may be selected such that the sub-cluster $C_1$ may be coherent with the original cluster C, such as avoiding the risk of a topic drift. Overall, N random sub-clusters $c_\theta = \{C_1, C_2, \ldots, C_N\}$ are sampled by the Cluster Randomizing Module 103.

For a given sub-cluster $C \in C_\theta$, let $L^{[k]}(C_i)$ be the corresponding list of top-k labels suggested by labeling algorithm L for that sub-cluster. The labeling algorithm L's decisiveness value with respect to a given label $l \in L^{[k]}(C)$ choice is defined as the labeling algorithm's self-label-agreement, derived by comparing label l's relative positions in the top-k label lists $L^{[k]}(C_i)$ with its original position in $L^{[k]}(C)$. The higher the agreement, the more labeling algorithm L is "decisive" with respect to its original choice of l as the label of cluster C.

The amount of local agreement is measured by the Label Ranking Module 104 by averaging the pair-wise agreement between $N(N-1)/2$ possible pairs of the sampled sub-clusters' top-k label lists $L^{[k]}(C_i)$. For example, the Label Ranking Module 104 measures how many of the sub-clusters (pair-wise) agree with each other about label l's relative position. For a given pair of sub-clusters $C_i, C_j \in c_\theta$ (drawn from the original cluster C by the Cluster Randomizing Module 103) and label $l \in L^{[k]}(C)$ ranked by the Label Ranking Module 104 using the labeling algorithm L at some position q ($1 \le q \le k$), the pair-wise agreement between the two corresponding top-k sub-cluster label lists is confirmed by checking that: (1) label l is also included in both top-k label lists $L^{[k]}(C_i)$ and $L^{[k]}(C_j)$ (2) label l is further positioned at least at position q in both lists (i.e., rank($l|L^{[k]}(C_i)) \le q$ and rank($l|L^{[k]}(C_j)) \le q$). Hence, each such confirmation may suggest that even in the presence of a (slightly) incomplete cluster data produced by the Cluster Randomizing Module 103, label l's relative position remains stable, implying that labeling algorithm L may be more decisive with respect to that label choice.

The decisiveness value measures the "local" agreement between the two lists by measuring the intersection size between any pair of label lists $L^{[k]}(C_i)$ and $L^{[k]}(C_j)$. Such intersection follows a hypergeometric distribution and the expected agreement is derived according to the (normalized) difference between the expected and the observed intersection size. For a given label position $1 \le q \le k$, let $L^{[q]}C_{i,j} = L^{[q]}(C_i) \cap L^{[q]}(C_j)$ denote the intersection between the a pair of (ranked) label lists, considering only those labels that are positioned at least at position $1 \leq q' \leq q$. Let $\mathcal{I}\{l \in L_{C_{i,j}}^{[q]}\}$ be an indicator, receiving the value of one if and only if label l is included in the intersection $L^{[q]}C_{i,j}$ (i.e., when positioned in both lists at position q or better), otherwise zero. For any pair of sub-clusters $C_i$, $C_j \in c_\theta$ labeled by labeling algorithm L, the corresponding expected (global) agreement between their corresponding top-k label lists $L^{[k]}(C_i)$ and $L^{[k]}(C_j)$ is given by:

$$\varphi_{i,j}^L(k) \stackrel{def}{=} \frac{|L^{[k]}(C_{i,j})| \cdot n_L - k^2}{k \cdot (n_L - k)} \qquad \text{EQN. 1}$$

Note that in the case of a full agreement (i.e., $|L^{[q]}C_{i,j}|=k$) we have $\varphi_{i,j}^L(k)=1$, while in the case of no agreement we have $$\varphi_{i,j}^L(k) \to 0 \text{ as } k \to \frac{n_L}{2}.$$

The cluster labeling algorithm L's decisiveness value with respect to a given label choice $l \in L^{[k]}(C)$ (denoted $w_L(l)$) is computed by the Label Ranking Module 104 using an equation for the average pair-wise list agreement:

$$w_L(l \mid C) \stackrel{def}{=} \frac{1}{2N(N-1)} \sum_{i,j} \frac{[\varphi_{i,j}^L(k)+1]}{2} \times \mathcal{I}\{l \in L^{[q]}(C_{i,j})\} \qquad \text{EQN. 2}$$

Therefore, a label 1 that has a high consensus about its specific position in $L^{[k]}(C)$ by highly agreeable lists $L^{[k]}(C_j)$ is estimated to be a more "reliable" label for cluster C based on labeling algorithm L's labeling decisions.

Following is described how the decisiveness values computed by the Label Ranking Module 104 may be used by the Label Fusion Module 105 to combine several cluster labeling algorithms for improving cluster labeling results. Let $\mathcal{L}^{[k]}(C) = \cup_{L \in \mathcal{L}} L^{[k]}(C)$ denote the overall label pool based on the union of all top-k label lists suggested by each labeling algorithm $L \in \mathcal{L}$. The goal is to find a combined cluster labeling (fusion) score, such that the top-k labels returned by scoring labels $l \in \mathcal{L}^{[k]}(C)$ according to that score may result in an improved cluster label suggestion by the Label Fusion Module 105.

Following are the definitions of two reference data fusion algorithms, frequently used in various information retrieval tasks, namely the CombSUM and CombMNZ fusion algorithms.

Given a label l's score $S_L(l|C)$, let $S_L^{norm}(l|C)$ denote its normalized score. The CombSUM fusion algorithm sums over the normalized label scores given by the various labeling algorithms in L:

$$CombSUM(l \mid \mathcal{L}^{[k]}(C)) = \sum_{L \in \mathcal{L}} S_L^{norm}(l \mid C) \qquad \text{EQN. 3}$$

The CombMNZ algorithm boosts labels based on the number of top-k label lists that include each label:

$$CombMNZ(l \mid \mathcal{L}^{[k]}(C)) = \# \{l \in L^{[k]}(C)\} \times \sum_{L \in \mathcal{L}} S_L^{norm}(l \mid C) \qquad \text{EQN. 4}$$

The cluster labeling algorithm's decisiveness value is integrated by the Label Fusion Module 105 within the fusion score by simply replacing each original (normalized) label score $S_L^{norm}(l|C)$ with the respective boosted score, computed as:

$$S_L^{OLD}(l \mid C) \stackrel{def}{=} w_L(l \mid C) \times S_L^{norm}(l \mid C) \qquad \text{EQN. 5}$$

Optionally, a label decisiveness value is used with Reciprocal Rank Fusion (RRF) by the Label Fusion Module 105 to produce a list of cluster labels, computed as:

$$RRF_{CLD}(l \mid \mathcal{L}^{[k]}(C)) = \sum_{L \in \mathcal{L}} \frac{1}{r_l(L(C)) * w_L^{norm}(l \mid C) + r_{mean}(L(C)) * (1 - w_L^{norm}(l \mid C))}$$

where $w_L^{norm}(l|C)$ denotes the normalized decisiveness value estimate and $r_{mean}(L(C))$ denotes the mean label rank position (i.e., k/2).

An embodiment of the proposed cluster labeling fusion method is evaluated using two sources of clusters data. The first source is based on the 20 News Group (20NG) collection, containing documents that were manually classified with labels into 20 different categories (each category with about 1000 documents). For example, the news groups comp.windows.x, talk.politics.guns, alt.atheism, soc.religion.christian, and the like were used to collect documents. The second source is a data collection that was gathered using the Open Directory Project (ODP), creating document clusters by random sampling of documents from 150 different ODP categories (each category with about 30-100 documents) and retrieving their contents from the world wide web. Gathered ODP clusters (categories) have diverse topics, including among others topics related to arts, technology, business, science, and the like. For example, the ODP categories are Recreation/Outdoors/Hunting, Health/Conditions_and_Diseases/Cancer, Sports/Water_Sports/Surfing, Recreation/Pets/Dogs, and the like.

The Match@k and MRR@k (Mean Reciprocal Rank) label quality measures were used for the evaluation some embodiments of the invention. The two measures evaluate a given labeling algorithm labeling algorithm's capability of providing a single correct label for a given cluster, which best describes the cluster's main topic. The Match@k measure returns 1 if and only if at least one correct label is located among the top-k labels proposed by the labeling algorithm. The MRR@k measure, on the other hand, returns the inverse of the rank of the first correct label in the top-k list. Otherwise, both measures return zero value.

To evaluate the relative performance of the various cluster labeling fusion algorithms that were described herein to embodiment of the present invention, two reference cluster labeling algorithms are used. The first is a direct cluster labeling algorithm, termed hereinafter as the JSD algorithm, and is based on the query difficulty model as described by Carmel et al in "What makes query difficult?" published in Proceedings of the 29th annual international ACM SIGIR conference on Research and development in information retrieval (pages 390-397). Cluster terms are ranked by the JSD algorithm according to their relative contribution to the Jensen-Shannon divergence between the cluster and the whole collection. The distribution of terms within the cluster/collection is computed by:

$$P(w \mid Cl) = \lambda \frac{n_w}{\sum_{w' \in Cl} n_{w'}} + (1-\lambda) P_C(w)$$

and the JSD distance between two distributions is computed using the equations:

$$D_{JS}(P\|Q) = \sum_w P(w) \log\left(\frac{P(w)}{M(w)}\right) + \sum_w Q(w) \log\left(\frac{Q(w)}{M(w)}\right), \text{ and}$$

$$\left(M(w) = \frac{1}{2}(P(w)+Q(w))\right)$$

The top-k scored terms are then suggested as the cluster's labels.

The second, termed hereinafter the Score Prorogation (SP) algorithm, is an indirect cluster labeling algorithm, which utilizes Wikipedia categories for cluster labeling. The SP algorithm maps important terms that were extracted by a given direct labeling algorithm (e.g., JSD terms) to Wikipedia categories that may better capture the cluster's main topic. Such mapping is done by submitting the list of top-k important cluster terms as a query to an inverted index of Wikipedia documents. Then, using a voting approach, cluster labels are chosen by picking those categories that obtained the highest votes, relatively to the scores prorogated from relevant Wikipedia documents to their associated categories. The SP labeling algorithm propagates document scores to the related labels, labels scores are propagated to the related keywords, and keywords scores are propagated back to their labels. The computations to perform the SP scoring algorithm are:

$$w(l) = \sum_{d:\, l \in d} \frac{score(d)}{n(d)},$$

$$w(kw) = \sum_{l:\, kw \in l} w(l), \text{ and}$$

$$SP(l) = \frac{1}{n(l)} \sum_{kw \in l} w(kw).$$

The top-k labels suggested by each labeling algorithm (i.e., JSD and SP algorithms) are combined using several fusion algorithms described herein. For example, the fusion algorithms CombMNZ, CombSUM, CombMAX and Borda-Count fusion algorithms were compared with fusion methods using the cluster label's decisiveness values computed by the Label Ranking Module 104, according to some embodiments of the invention.

Optionally, a training cluster of text documents is used to determine the number of sub-clusters to use and the amount of noise to introduce to each sub-cluster. For example, the training cluster has a true, known label list determined by manual inspection. For example, the manual inspection is performed incrementally for each text document in the training cluster, and after each text document receives a true list of labels, embodiments of the method are performed in the background to compare statistically the current incremental true label lists with the fused label list. When the statistical confidence and power computed between the true labels and the fused label list is above an acceptable threshold, the computerized system 100 may send a notification to the user performing the manual labeling of the text documents, and the fused label list presented.

In this example comparison, the 20NG collection was used to determine optimum values for θ and the number of sub-clusters (N) to use in determining each label's decisiveness value, while the large ODP collection (with 150 clusters) was used for the comparison with other algorithms. The best parameter configuration found by analysis of the 20NG collection was θ=0.05 and N=20.

Figure 5A:
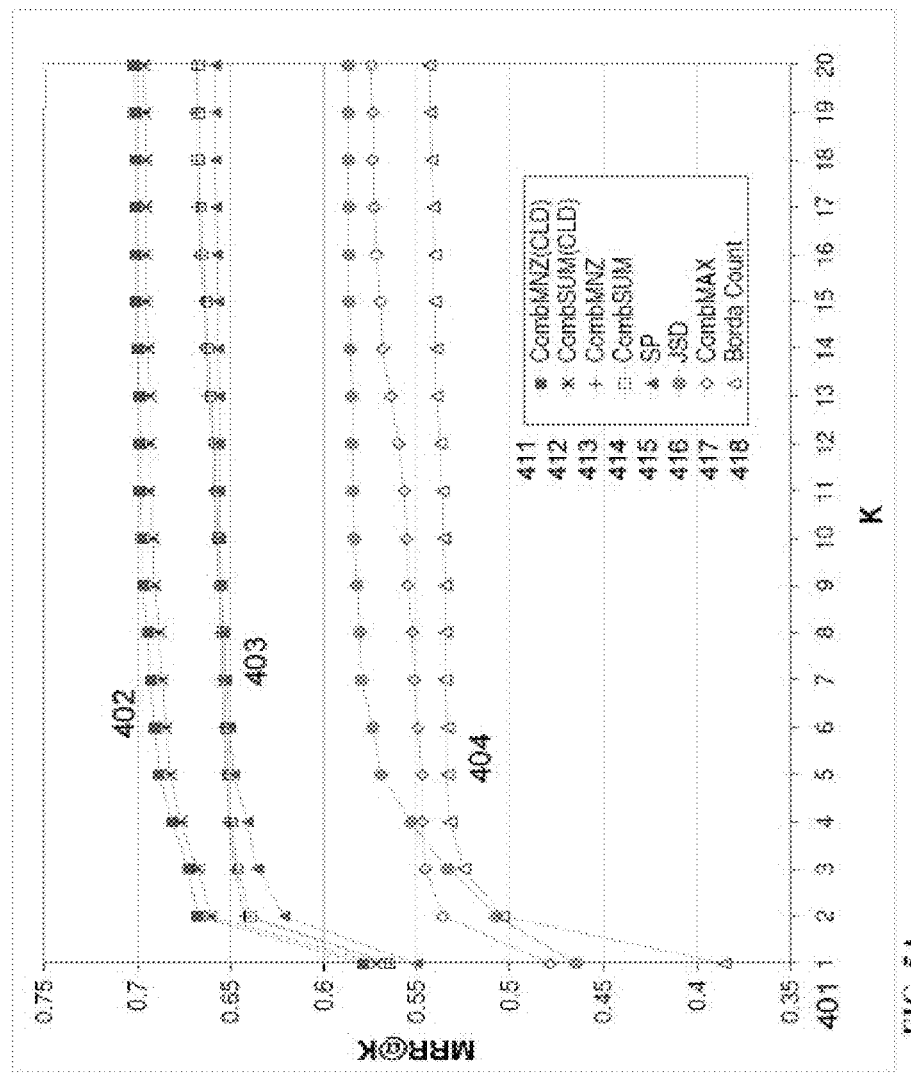
FIG. 5A is a graph of example label fusion method results compared by a first comparison measure, according to some embodiments of the invention.

The resulting analysis concludes that embodiments of the cluster labeling fusion method provided herein that consider the label's decisiveness value produce better labeling performance than considering a single labeling algorithm or fusion of labeling algorithms without the decisiveness value. Reference is now made to FIG. 5A, which is a graph of example label fusion algorithm results evaluated by MRR@K, according to some embodiments of the invention. The graph 401 shows the performance of several labeling algorithms, reference fusion algorithms, and embodiments of the current invention. Labeling algorithms Jensen-Shannon Divergence (JSD) 416 and Score Prorogation (SP) 415 were computed from an example cluster of documents, and combined with standard label fusion algorithms CombMNZ 412, CombSUM 414, CombMAX 417, and Borda-Count 418. The embodiments of the current invention using cluster label decisiveness (CLD) illustrated are CombMNZ(CLD) 411 and CombSUM(CLD) 412. The graph 401 shows that the CLD-based fusion methods 401 produced consistently higher MRR@K scores than the other algorithms, as at 403 and 404. For each k, the values reported for the CLD-based fusion methods are statistically significant (paired t-test, p-value <0.05).

Figure 5B:
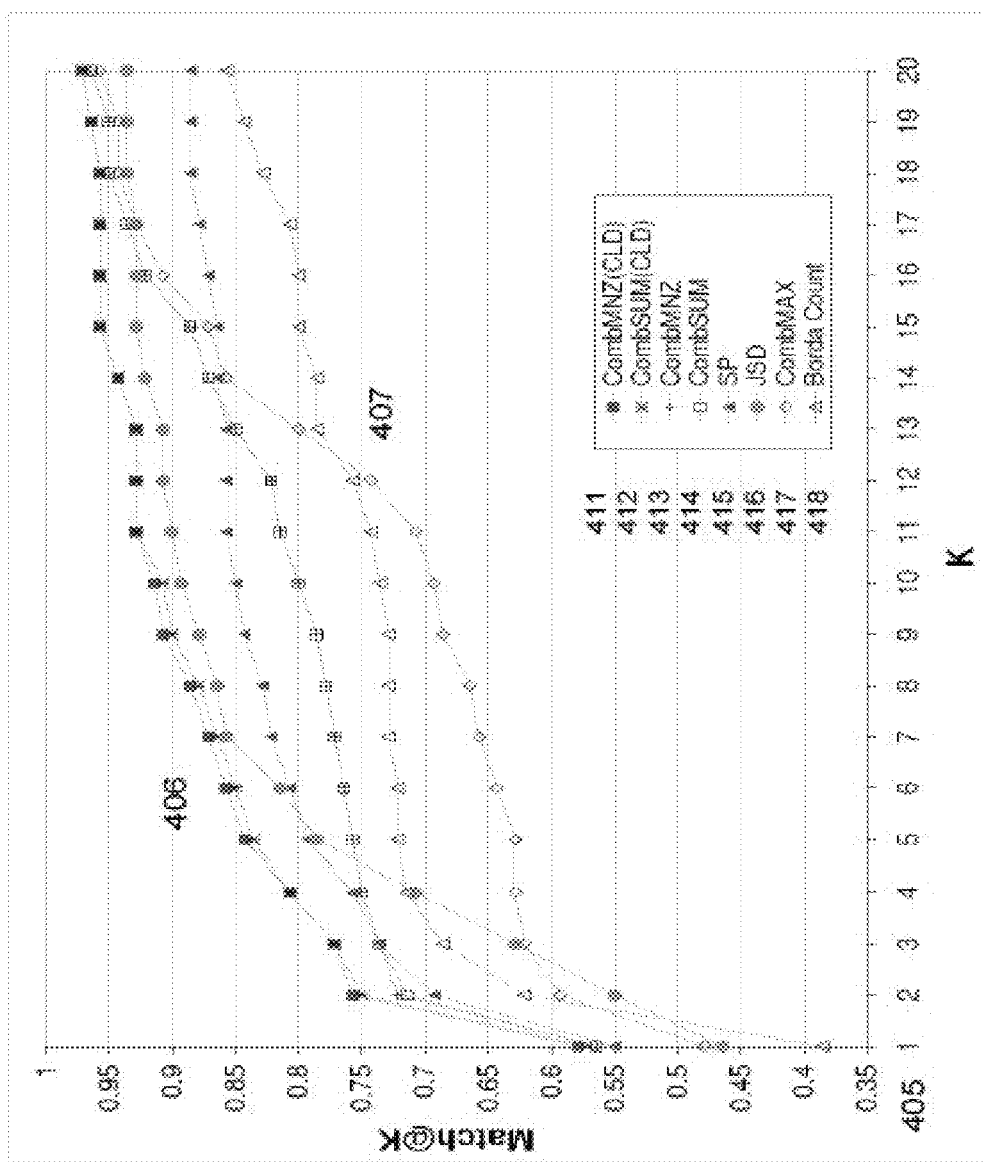
FIG. 5B is a graph of example label fusion method results compared by a second comparison measure, according to some embodiments of the invention.

Reference is now made to FIG. 5B, which is a graph of example label fusion algorithm results evaluated by Match@K, according to some embodiments of the invention. In this graph 405 it can be seen that the CLD-based methods 406 again performed consistently better using the Match@K metric than the other algorithms 407.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant document clustering labeling algorithms will be developed and the scope of the term clustering labeling algorithm is intended to include all such new technologies a priori.

It is expected that during the life of a patent maturing from this application many relevant label fusing algorithms will be developed and the scope of the term label fusing algorithm is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for labeling a cluster of text documents, comprising:

receiving a document cluster comprising a plurality of text documents;

producing automatically a plurality of document sub-clusters, wherein each of said plurality of document sub-clusters comprising said plurality of text documents and wherein at least one document of said plurality of text documents in said each of said plurality of document sub-clusters is randomly changed;

applying automatically a plurality of cluster labeling algorithms on said document cluster and on each of said plurality of document sub-clusters, to generate a plurality of ordered lists;

generating a plurality of ranked label lists one for each of said plurality of cluster labeling algorithms, by performing the actions of:

selecting automatically a selected algorithm from one of said plurality of cluster labeling algorithms;

computing automatically a plurality of label values, one for each of said plurality of cluster labels in said plurality of ordered lists for said selected algorithm;

generating one of said plurality of ranked label lists corresponding to said selected algorithm, wherein said one ranked label list is computed from respective said plurality of ordered lists and respective said label value for each of respective said plurality of cluster labels; and combining said plurality of ranked label lists using a label fusing algorithm to produce a fused label list; and outputting the fused label list in response to the receiving of the document cluster to improve a search quality measure selected from a group consisting of mean reciprocal rank measure and top-k labels measure;

wherein said random changes and said plurality of document sub-clusters are determined by a training document cluster, wherein said training document cluster has a true label list determined by manual inspection, and wherein said random changes are determined by a comparing of said fused label list with said true label list; and wherein said true label list determined by manual inspection is determined incrementally until said comparing produces a statistical confidence above a confidence threshold and a statistical power above a power threshold.

2. The method of claim 1, wherein said label fusing algorithm is computing using said label value for each of said plurality of cluster labels in addition to said plurality of ranked label lists.

3. The method of claim 1, wherein said label fusing algorithm is selected from a group consisting of a CombMNZ fusing algorithm, a CombSUM fusing algorithm, a CombSUM fusing algorithm, a reciprocal rank fusion algorithm, and a Borda-Count fusion algorithm.

4. The method of claim 2, wherein said label fusing algorithm incorporates said plurality of label values in fusing labels from said plurality of cluster labeling algorithms.

5. The method of claim 1, wherein said random changes comprise a removal of at least one of said plurality of text document from said document cluster.

6. The method of claim 1, wherein said random changes are performed on a percentage of said plurality of text documents.

7. The method of claim 1, wherein each of said plurality of document sub-clusters comprises an equal number of text documents.

8. The method of claim 1, wherein each of said plurality of document sub-clusters comprises a number of text documents determined randomly according to a Gaussian distribution.

9. The method of claim 1, wherein for each of said plurality of cluster labeling algorithms a different set of said plurality of document sub-clusters is produced, and wherein each of said different set comprises different said random changes.

10. The method of claim 1, wherein a single set of said plurality of document sub-clusters is produced, and wherein said single set is used for each of said plurality of cluster labeling algorithms.

11. The method of claim 1, wherein said method is offered as a service.

12. A computer readable medium comprising computer executable instructions adapted to perform the method of claim 1.

13. A computer program product for labeling a cluster of text documents, said computer program product comprising:
a computer readable storage medium having stored thereon:
first program instructions executable by a processor to cause a device to receive a document cluster comprising a plurality of text documents;
second program instructions executable by the device to cause said device to produce automatically a plurality of document sub-clusters, wherein each of said plurality of document sub-clusters comprising said plurality of text documents and wherein at least one document of said plurality of text documents in said each of said plurality of document sub-clusters is randomly changed;
third program instructions executable by the device to cause said device to apply automatically a plurality of cluster labeling algorithms on said document cluster and each of said plurality of document sub-clusters, to generate a plurality of ordered lists;
fourth program instructions executable by the device to cause said device to generate a plurality of ranked label lists one for each of said plurality of cluster labeling algorithms, by performing the actions of:
selecting automatically a selected algorithm from one of said plurality of cluster labeling algorithms;
computing automatically a plurality of label values, one for each of said plurality of cluster labels in said plurality of ordered lists for said selected algorithm;
generating one of said plurality of ranked label lists corresponding to said selected algorithm, wherein said one ranked label list is computed from respective said plurality of ordered lists and respective said label value for each of respective said plurality of cluster labels; and
fifth program instructions executable by the device to cause said device to combine said plurality of ranked label lists using a label fusing algorithm to produce a fused label list;
sixth program instructions executable by the device to output the fused label list in response to the receiving of the document cluster to improve a search quality measure selected from a group consisting of mean reciprocal rank measure and top-k labels measure;
wherein said random changes and said plurality of document sub-clusters are determined by a training document cluster, wherein said training document cluster has a true label list determined by manual inspection, and wherein said random changes are determined by a comparing of said fused label list with said true label list; and
wherein said true label list determined by manual inspection is determined incrementally until said comparing produces a statistical confidence above a confidence threshold and a statistical power above a power threshold.

14. A computerized system for labeling a cluster of text documents, comprising:
a user interface, for controlling and monitoring said computerized system;
a data interface, for receiving a document cluster;
at least one processing unit, comprising:
a cluster randomizing module configured to receive a document cluster including a plurality of text documents and produce automatically a plurality of randomized sub-clusters, where each of said plurality of randomized sub-clusters is created from said document cluster by including said plurality of text documents and changing at least one of said text documents in each of said randomized sub-clusters;
a label ranking module configured to receive said plurality of randomized sub-clusters, apply a plurality of cluster labeling algorithms to each of said plurality of randomized sub-clusters to produce a plurality of label lists, determine a label value for each label of said plurality of cluster labeling algorithms, and re-rank each of said plurality of label lists for each of said plurality of cluster labeling algorithms according to said label value; and
a label fusion module configured to receive re-ranked said plurality of label lists, fuse said plurality of label lists together to a single list for said document cluster, and send said single list in response to the receiving of the re-ranked said plurality of label lists to improve a search quality measure selected from a group consisting of mean reciprocal rank measure and top-k labels measure;

wherein said random changes and said plurality of document sub-clusters are determined by a training document cluster, wherein said training document cluster has a true label list determined by manual inspection, and wherein said random changes are determined by a comparing of said fused label list with said true label list; and wherein said true label list determined by manual inspection is determined incrementally until said comparing produces a statistical confidence above a confidence threshold and a statistical power above a power threshold.

* * * * *